United States Patent
Shilov

(10) Patent No.: US 10,854,342 B2
(45) Date of Patent: Dec. 1, 2020

(54) METHOD OF MANUFACTURING A PELLETIZED NUCLEAR CERAMIC FUEL

(71) Applicants: Joint Stock Company "Scientific-research institute of chemical technology", Moscow (RU); JOINT STOCK COMPANY "SCIENCE AND INNOVATIONS", Moscow (RU)

(72) Inventor: Vasiliy Vasil'evich Shilov, Moscow (RU)

(73) Assignees: Joint Stock Company Scientific-Research Institute of Chemical Technology, Moscow (RU); Joint Stock Company "Science and Innovations", Moscow (RU)

( * ) Notice: Subject to any disclaimer, the term of this patent is extended or adjusted under 35 U.S.C. 154(b) by 0 days.

(21) Appl. No.: 16/309,317

(22) PCT Filed: Dec. 8, 2017

(86) PCT No.: PCT/RU2017/000915
§ 371 (c)(1),
(2) Date: Dec. 12, 2018

(87) PCT Pub. No.: WO2018/208185
PCT Pub. Date: Nov. 15, 2018

(65) Prior Publication Data
US 2020/0058413 A1    Feb. 20, 2020

(30) Foreign Application Priority Data
May 12, 2017   (RU) ................ 2017116513

(51) Int. Cl.
*G21C 3/62* (2006.01)
*G21C 3/04* (2006.01)

(52) U.S. Cl.
CPC ............. *G21C 3/623* (2013.01); *G21C 3/044* (2013.01); *G21C 3/045* (2019.01)

(58) Field of Classification Search
CPC .................................. G21C 3/45; G21C 3/623
See application file for complete search history.

(56) References Cited

U.S. PATENT DOCUMENTS

| | | | | |
|---|---|---|---|---|
| 3,714,061 A | * | 1/1973 | Triggiani | C01G 43/025 252/635 |
| 3,969,477 A | * | 7/1976 | Keith | C01G 43/025 423/19 |
| 2014/0093733 A1 | * | 4/2014 | Na | C01G 43/025 428/402 |

* cited by examiner

*Primary Examiner* — Peter F Godenschwager
(74) *Attorney, Agent, or Firm* — Brandon V. Zuniga; James R. Gourley; Carstens & Cahoon, LLP

(57) ABSTRACT

The invention is related to nuclear technologies, in particular, to the technology of producing nuclear oxide fuel for fuel elements, this oxide fuel can be used for manufacturing palletized nuclear fuel from uranium dioxide to be consumed by NPPs. The essence of the invention: this method of producing palletized nuclear fuel from uranium dioxide involves preparation of uranium dioxide moulding powder with/without uranium oxide, at this point powdered uranium dioxide is used as a raw material for preparation of moulding powder. Powdered uranium dioxide should be in the following proportion: O/U=2.37±0.04, it is obtained using a renowned method—by air heating of powdered uranium dioxide (ceramic grade) with the following proportion O/U=2.01–2.15. The technical result of the invention is increased mechanical strength of sintered pellets and a larger grain size of sintered pellets.

1 Claim, 2 Drawing Sheets

METHOD OF MANUFACTURING A PELLETIZED NUCLEAR CERAMIC FUEL

CROSS-REFERENCE TO RELATED APPLICATIONS

This application is a US 371 Application from PCT/RU2017/000915 filed Dec. 8, 2017, which claims priority to Russia Application 2017116513 filed May 12, 2017, the technical disclosures of which are hereby incorporated herein by reference.

The invention relates to nuclear engineering, in particular, to the technology of manufacturing pelletized oxide nuclear fuel for fuel elements of NPP.

DETAILED DESCRIPTION

Figure 1:
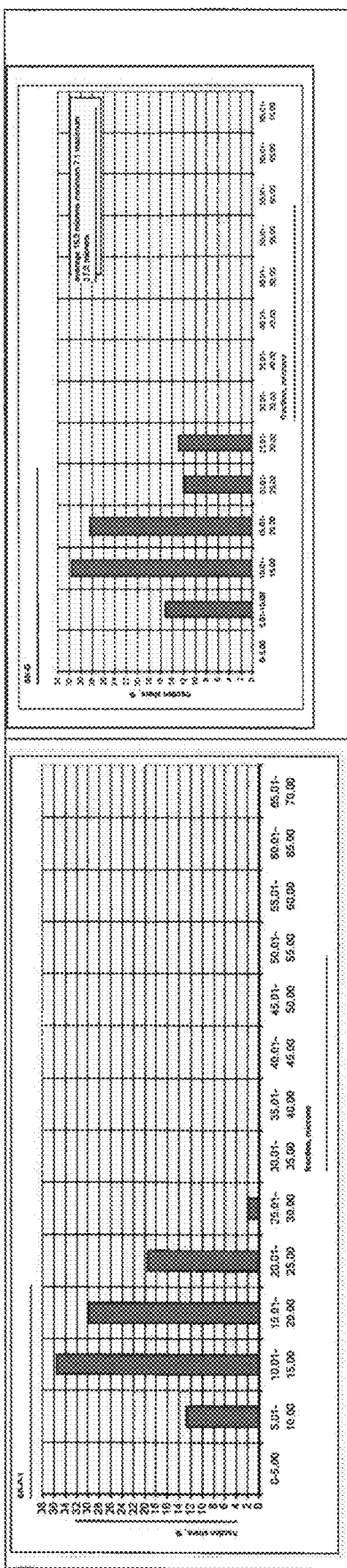
FIG. 1 shows the grain size distribution of sintered pellets as determined using optical microscopy.
Figure 1:
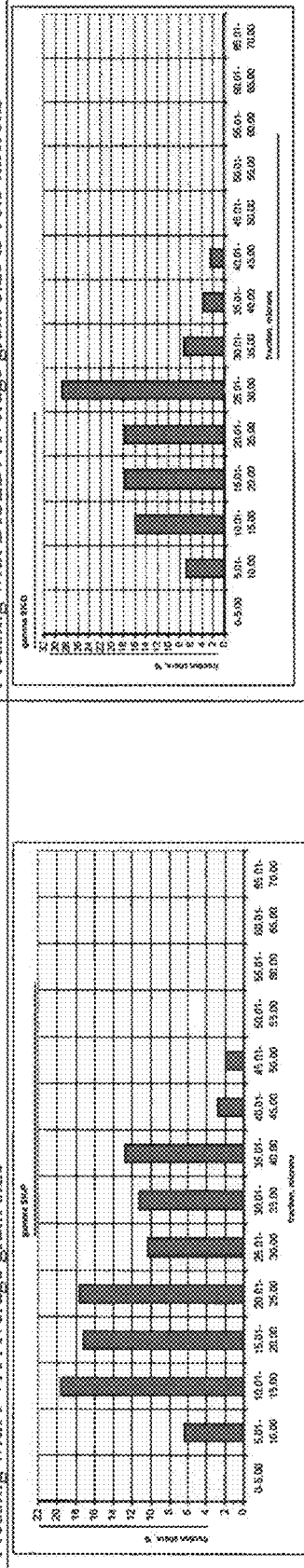

As a result of conducted (but not completed yet) long-term studies of the complex U (Uranium)-O (Oxygen) system, the existence of more than 20 uranium oxides and their modifications has been established [Maiorov A. A., Braverman I. B., Powders of ceramic uranium dioxide production technology, M., Energoatomizdat, 1985, p. 10, Table. 2.1,], 4 of which are of interest for the use in the manufacturing of pelletized ceramic fuel by powder metallurgy method:

|  | Proportion O/U | crystallographic system | theoretical density, g/cm$^3$ |
|---|---|---|---|
| uranium dioxide UO$_2$ (α-phase) | 2.00 ... 2.19 | cubic | 10.96 |
| uranium dioxide U$_4$O$_9$ (β-phase) | 2.20 ... 2.25 | cubic | 11.30 |
| uranium dioxide U$_3$O$_7$ (γ-phase) | 2.34 ... 2.41 | tetragonal | 11.30-11.50 |
| concentrated uranium oxide U$_3$O$_8$ | 2.66 | orthorhombic | 8.39 |

It is known, for example, the method of fuel pellets' manufacturing [Patent of England No. 1371595, MKI G 21 C 3/62 dated Mar. 16, 1971], including preparation of uranium dioxide (UO$_2$) moulding powder, mixing with a binder, pressing into pellets, sintering of compressed pellets in a reducing media.

It is also known the method [Patent No. 0249549 dated Dec. 16, 1987, MKI G 21 C 3/62)], according to which they use a mixture of U$_3$O$_8$ triuranium octoxide powder (concentrated uranium oxide) with UO$_2$ uranium dioxide powder to manufacture sintered pellets, wherein with the predominance of concentrated uranium oxide in this mixture. Obtained by this method, sintered pellets are characterized by low density and high porosity, which is caused by the structural transformations of concentrated oxide in the reduction process according to the reaction

$$U_3O_8 + 2H_2 = 3UO_2 + 2H_2O \qquad (1)$$

long before the start of the sintering process with obtaining the final product (uranium dioxide), having a higher theoretical density (TD). The consequence of these structural transformations is the formation of uranium dioxide particles, the size of which is smaller than the size of the concentrated uranium oxide initial particles. In the volume of a compressed pellet, this leads to a breakdown in the existing contact with a particle of uranium dioxide, the formation of a "gap" between the particles, wherein the larger the particle of the concentrated uranium oxide—the greater this gap.

This is why leading foreign and domestic manufacturers limit the amount of concentrated oxide, being added to the ceramic powder of uranium dioxide to 10-15 wt. % when manufacturing the pelletized fuel.

Sintered pellets are subject to rather stringent requirements in terms of density, geometric dimensions, mechanical strength, microstructure, thermal stability, and other parameters.

It is also known the method [Patent of the Russian Federation No. 2148279 IPC$^7$ G21C 3/62, published in Apr. 27, 2000)], according to which, during the preparation of the moulding powder, they add homogenized agglomerates U$_3$O$_8$ of the required size, made of homogeneous in chemical composition powder, to the UO$_2$ powder.

It is also known the method of manufacturing pelletized nuclear fuel [Patent of the Russian Federation No. 2170957 IPC$^7$ G 21 C 3/62, 21/04, published in Jul. 20, 2001)], including three-stage mixing of powders of uranium dioxide UO$_2$, and concentrated uranium oxide U$_3$O$_8$ with a binder.

It is also proposed the method [Patent of the Russian Federation No. 2338274 IPC G 21 C 3/62, published in Nov. 10, 2008)], envisaging pretreatment of uranium dioxide UO$_2$ powder or a mixture of uranium dioxide UO$_2$ powder with concentrated uranium oxide U$_3$O$_8$ in grinding devices before the operation of mixing with a solid plasticizer.

The closest to the proposed invention is the method, chosen as a prototype [Patent of France No. 2599883, IPC G 21 C 3/62, published in Dec. 11, 1987)], according to which they cold-press pellets from the mixture of UO$_2$ powder with an addition of 5-40% U$_3$O$_8$ powder with particles sixes <350 microns, which pellets next are being sintered at a temperature of 1500-1800° C. in a reducing atmosphere or at 1200-1300° C. in an oxidizing environment.

The drawback of all these methods, including the one chosen as a prototype, is the decrease in a mechanical strength of the sintered pellets. The reason for this is considered to be the formation of porous areas with acute-angled pores at the location of the concentrated uranium oxide particles.

The transformation of the concentrated uranium oxide with a density of 8.39 g/cm$^3$ into uranium dioxide with a density of 10.96 g/cm$^3$ is accompanied by a decrease in the volume of particles and, accordingly, by a decrease in their linear size. In the system, which is a compressed pellet with contacting particles of uranium concentrated dioxide and dioxide, a new particle of uranium dioxide, formed during the reduction of the concentrated oxide particle, becomes distanced from the matrix's particle of uranium dioxide, which remains motionless. Thus, additional porosity is being created between the matrix's particles of uranium dioxide and the newly formed particles of uranium dioxide, the size of which will depend on the grain size of the concentrated uranium oxide. It is known, that the porosity in a compressed pellet can be reduced by increasing the pressing pressure, however, in this case the wear of the pressing tool increases, the probability of over-pressing cracks increases, the direct output into a useful product reduces.

An object of the present invention is the development and creation of the method for manufacturing nuclear fuel pellets, that meets the exclusive standards for mechanical strength, the microstructure of sintered pellets.

As a result of solving this object, it is possible to obtain new technical results, providing the expanding range of used raw powders and ensuring the possibility of obtaining nuclear fuel with the density, strength and microstructure of sintered pellets, necessary according to the operating regime.

The solution of this object is achieved by that in the method of obtaining fuel pellets, which includes the preparation of moulding powder with or without an addition of concentrated uranium oxide powder:

preliminary they oxidize ceramic grade uranium dioxide powder by heating in air in a known manner to the composition of uranium dioxide γ-phase with a proportion of O/U=2.37±0.04.

Obtaining the powder of the $U_3O_7$ uranium dioxide γ-phase composition is not difficult and it was tested in the workshop conditions with the use of a rotary kiln, a fluidized bed (vibratory fluidized bed), as well as in stationary conditions (muffle).

The same as a concentrated uranium oxide, this oxide, when heated in a reducing atmosphere (in a stream of hydrogen), is being reduced long before the start of sintering process to uranium dioxide according to the reaction $$U_3O_7 + H_2 = 3UO_2 + H_2O \quad (2)$$

However, when this molecular entity is being reduced, in contrast to the reduction of concentrated oxide, the linear size of the uranium dioxide forming particle does not decrease, but increases, i.e. convergence occurs in the mixture for the matrix's particles of uranium dioxide powder and the particles of uranium dioxide, which are newly formed at the reduction of uranium dioxide γ-phase. This circumstance not only contributes to a decrease in the initial porosity of the compressed pellet and to decrease in the size of most "gaps" between particles of uranium dioxide less then a diffusion length of ions at sintering, but also provides an increase in the grain size of the sintered pellet.

A conducted comparative analysis between proposed invention and the prototype revealed the following significant distinguishing feature:

the use of uranium dioxide with a proportion of O/U=2.37±0.04 (γ-phase of uranium dioxide), specially made from a standard ceramic grade uranium dioxide powder with the proportion O/U=2.01-2.15 in the moulding powder preparation process.

Thus, the invention meets the "novelty" patentability criterion.

Compared with existing analogues, including the prototype, the specified distinguishing feature ensures the achievement of a new technical result:

obtaining sintered pellets with controllable total porosity;
obtaining sintered pellets with increased grain size;
obtaining sintered pellets with increased mechanical strength.

Thus, the invention meets the "inventive step" patentability criterion.

The method is implemented as follows.

EXAMPLE 1

They pour 300 g of a ceramic grade uranium dioxide powder, obtained by the method of uranium hexafluoride dry conversion (the total specific surface area of the powder is 2.8 m$^2$/g), as a layer of 10-15 mm in a stainless steel baking tray, place it in a muffle, preheated to a temperature of 160±10° C., and keep in it for 3-5 minutes when the muffle door is open. Then they remove a baking tray with the powder out of the muffle and cool it down to the room temperature.

Thus way obtained the powder with a proportion of O/U=2.37±0.04 is used for manufacturing of sintered pellets according to standard technology:

they add a 6% solution of polyvinyl alcohol (PVA) with glycerin to the powder as a binder and mix it thoroughly in a porcelain cup;

they press the prepared batch at a specific pressure of 1100-1200 kg/cm$^2$ in a matrix with a diameter of 20 mm;

they grind up the obtained "tiles" in a mortar and rubbed through a strainer with a mesh size of 0.63 mm;

prepared thus way moulding powder is pressed at specific pressure of 2100-2200 kg/cm$^2$ in a matrix of 9.3 mm diameter;

they sinter pressed pellets at a temperature of 1700° C. in an argon-hydrogen mixture; holding at this temperature is equal to 2 hours.

The results of the powder processing are shown in the Table 1 in comparison with the results of regular powder sintering; FIG. 1 shows sintered pellets distribution on the grain size, which was determined using optical microscopy.

EXAMPLE 2

They mix the powder with a proportion of O/U=2.37±0.04, prepared the same as in example 1, with 0.3% 1.2-DISED (distearyl ethylenediamine) with the formula $C_{38}H_{76}O_2N_2$ as a dry lubricant. They manufacture pellets from the prepared mixture, as in the example 1. The results of the powder processing are shown in the Table 1 in comparison with the results of regular powder sintering; FIG. 1 shows sintered pellets distribution on the grain size, which was determined using optical microscopy.

EXAMPLE 3

They mix the powder with a proportion of O/U=2.37±0.04, prepared as in example 1, with 10% of concentrated uranium oxide (specific surface area 8.2 m$^2$/g), obtained from ammonium polyuranate. Prepared homogeneous mixture is processed as in the example 1.

Figure 2:
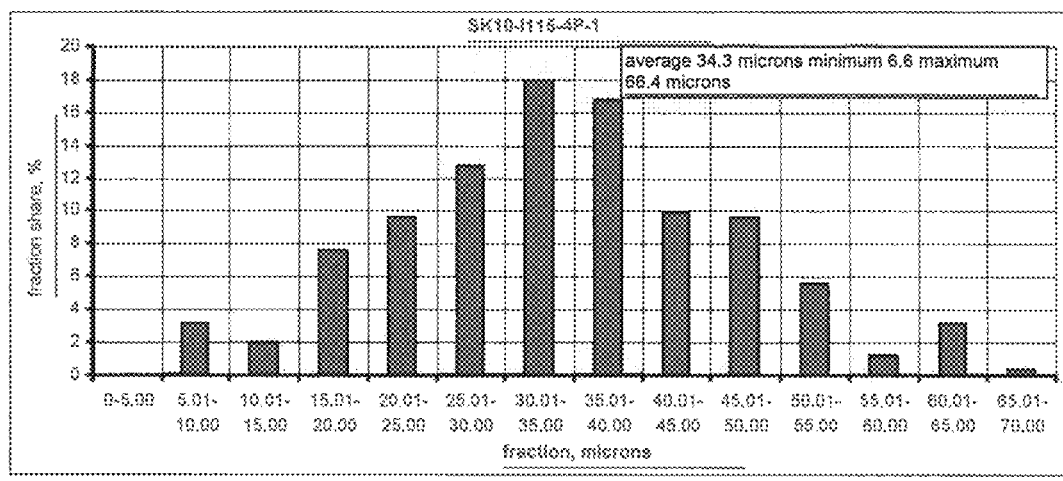
FIG. 2 shows the grain size distribution of sintered pellets as determined using optical microscopy.

The results of powder processing are shown in the Table 1; FIG. 2 shows sintered pellets distribution on the grain size, which was determined using optical microscopy.

TABLE 1

| Powder of | | Pellets density, g/cm$^3$ | |
|---|---|---|---|
| uranium dioxide | Binder | pressed | sintered |
| Regular factory-made | PVA | 6.15-6.20 | 10.62-10.66 |
| According to the invention | | 6.15-6.20 | 10.68 |
| Regular factory-made | DISED | 5.34-5.36 | 10.58-10.66 |
| According to the invention | | 5.57-5.59 | 10.57 |
| According to the invention with an addition of concentrated oxide | PVA | 5.81-5.83 | 10.45 |

The invention claimed is:
1. A method of manufacturing a pelletized nuclear ceramic fuel, including preparation of uranium dioxide moulding powder with or without an addition of concen- trated uranium oxide, pressing the moulding powder into pressed pellets and sintering the pressed pellets in a reducing atmosphere, wherein uranium dioxide powder is utilized as a raw material for the preparation of the uranium dioxide moulding powder, the uranium dioxide powder having a proportion of oxygen to uranium equal to: 2.37±0.04, and the uranium dioxide powder being preliminarily obtained by heating a ceramic grade uranium dioxide powder in air.

\* \* \* \* \*